United States Patent
Dawson et al.

(10) Patent No.: US 10,545,802 B2
(45) Date of Patent: Jan. 28, 2020

(54) EVENT LOOP OPTIMIZATION THROUGH EVENT ORDERING

(71) Applicant: International Business Machines Corporation, Armonk, NY (US)

(72) Inventors: Michael H. Dawson, Ottawa (CA); Gireesh Punathil, Kannur (IN)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 15/455,187

(22) Filed: Mar. 10, 2017

(65) Prior Publication Data

US 2018/0260259 A1 Sep. 13, 2018

(51) Int. Cl.
*G06F 9/54* (2006.01)

(52) U.S. Cl.
CPC .................... *G06F 9/542* (2013.01)

(58) Field of Classification Search
CPC ....................................... G06F 9/542
See application file for complete search history.

(56) References Cited

U.S. PATENT DOCUMENTS

| | | | | |
|---|---|---|---|---|
| 2004/0034856 A1* | 2/2004 | Boudnik | ............. | G06F 9/465 718/103 |
| 2005/0081203 A1* | 4/2005 | Aguilar, Jr. | ......... | G06F 9/4881 718/100 |
| 2007/0256077 A1* | 11/2007 | Zhong | .................... | G06F 9/505 718/104 |
| 2009/0288089 A1 | 11/2009 | Choi et al. | | |
| 2010/0205484 A1* | 8/2010 | Dragicevic | ......... | G06F 11/3636 714/37 |
| 2010/0241722 A1* | 9/2010 | Seminaro | ............. | H04L 67/025 709/207 |
| 2014/0032739 A1* | 1/2014 | De Armas | .............. | G06F 9/542 709/224 |
| 2015/0006234 A1* | 1/2015 | Boyette | ............ | G06Q 10/06316 705/7.26 |
| 2016/0034139 A1* | 2/2016 | Boneti | ................. | G06F 3/04817 715/835 |
| 2016/0036716 A1 | 2/2016 | Pal et al. | | |

(Continued)

OTHER PUBLICATIONS

Swenson-Healey, E. "The JavaScript Event Loop: Explained", retrieved from http://blog.carbonfive.com/2013/10/27/the-javascript-event-loop-explained/; Oct. 2013.

(Continued)

*Primary Examiner* — Tuan C Dao
(74) *Attorney, Agent, or Firm* — Brown & Michaels, PC; Nicholas Bowman (57) ABSTRACT

A method of event loop optimization through event ordering within an event loop of a node to improve externally visible attributes of the runtime. The optimization is carried out by labeling a set of events by assigning one or more attributes to each event of the set of events; processing a plurality of events of the set of events for an interval based on at least the attributes of each event of the plurality of events; ordering the events of the plurality of events within the interval based on assigned priorities to the one or more assigned attributes of each event of the plurality of events; and executing the plurality of events in the order determined based on the assigned priorities.

18 Claims, 5 Drawing Sheets

(56) References Cited

U.S. PATENT DOCUMENTS

| | | | |
|---|---|---|---|
| 2016/0170834 A1* | 6/2016 | Erickson | G06F 16/13 |
| | | | 707/649 |
| 2017/0200129 A1* | 7/2017 | Garg | G06Q 10/1093 |
| 2018/0121484 A1* | 5/2018 | Gerashchenko | G06Q 10/00 |

OTHER PUBLICATIONS

Norris, T. "Understanding the Node.js Event Loop", retrieved from https://nodesource.com/blog/understanding-the-nodejs-event-loop/; Jan. 2015.

Nallan, K. "Understanding process.nextTick( )", retrieved from https://howtonode.org/understanding-process-next-tick; Jan. 2012.

"Node.js v6.6.0 Documentation", retrieved from https://nodejs.org/api/process.html; as early as Jan. 2011.

* cited by examiner

EVENT LOOP OPTIMIZATION THROUGH EVENT ORDERING

BACKGROUND

The present invention relates to event loop optimization, and more specifically to event loop optimization for Node.js through event ordering.

There are two approaches to handling large numbers of transactions within runtimes. One approach uses multiple threads to do work in parallel and synchronization techniques to co-ordinate between those threads.

The other approach uses an "event-loop", a programming construct that waits for and dispatches events or messages in a program, where a single thread (or a small number of independent event-loops) processes the work for the event-loop. In the event-loop loop, events become ready and at some interval, and the single thread processes those events. In the processing for each interval, the single thread invokes the function registered for each ready event until all events have been serviced.

Commonly, in existing implementations, for example Node.js/libuv, for example, the order the events are processed is not specified and is simply a result of the implementation choices made in the operating system and/or the timing at which the events became ready.

Node.js is a single-threaded application, which can support concurrency via events and callbacks. The node depends on multiple libraries. One of those libraries is Libuv, which handles the queueing and processing of asynchronous events. Libuv utilizes as much of the underlying functionality available from the operating system's kernel as possible. When possible, requests are delegated to and handled by the operating system. Incoming connections are queued by the system until they can be handled by libuv/Node.js.

Many Node.js APIs are asynchronous and can therefore use async function calls to maintain concurrency. Generally, a Node.js application is initiated by setting up a number of events and listeners waiting on those events. As events occur as signaled by the operating system, the functions registered as listeners are invoked. These functions may generate responses, register additional listeners or remove listeners. The application continues to run until there are no more move events registered in the event loop at which point the application terminates.

SUMMARY

According to one embodiment of the present invention a method of event loop optimization through event ordering within an event loop of Node.js is disclosed. The method comprising the steps of: a computer labeling a set of events by assigning one or more attributes to each event of the set of events; the computer processing a plurality of events of the set of events for an interval based on at least the attributes of each event of the plurality of events; the computer ordering the events of the plurality of events within the interval based on assigned priorities to the one or more assigned attributes of each event of the plurality of events; and the computer executing the plurality of events in the order determined based on the assigned priorities.

According to another embodiment of the present invention, a computer program product for event loop optimization through event ordering within an event loop of Node.js is disclosed. The computer program product comprising: a computer comprising at least one processor, one or more memories, one or more computer readable storage media, the computer program product comprising a computer readable storage medium having program instructions embodied therewith. The program instructions executable by the computer to perform a method comprising: labeling, by the computer, a set of events by assigning one or more attributes to each event of the set of events; processing, by the computer, a plurality of events of the set of events for an interval based on at least the attributes of each event of the plurality of events; ordering, by the computer, the events of the plurality of events within the interval based on assigned priorities to the one or more assigned attributes of each event of the plurality of events; and executing, by the computer, the plurality of events in the order determined based on the assigned priorities.

According to another embodiment of the present invention, a computer system for event loop optimization through event ordering within an event loop of Node.js is disclosed. The computer system comprising: a computer comprising at least one processor, one or more memories, one or more computer readable storage media having program instructions executable by the computer to perform the program instructions. The program instructions comprising: labeling, by the computer, a set of events by assigning one or more attributes to each event of the set of events; processing, by the computer, a plurality of events of the set of events for an interval based on at least the attributes of each event of the plurality of events; ordering, by the computer, the events of the plurality of events within the interval based on assigned priorities to the one or more assigned attributes of each event of the plurality of events; and executing, by the computer, the plurality of events in the order determined based on the assigned priorities.

DETAILED DESCRIPTION

It will be recognized that in an embodiment of the present invention, handling events from an event-loop in a specific order can improve externally visible attributes of the runtime, such as apparent responsiveness. Furthermore, in an embodiment of the present invention, optimization can be used to identify how to best order events and then modify the runtime so that the events are executed in the optimized order.

In another embodiment, optimization is provided for the Node.js event-loop.

It will also be recognized that existing solutions neither capture the information required to know what the preferred order would be, nor do they order the events. Instead the order is simply a result of earlier operating system based implementation choices.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
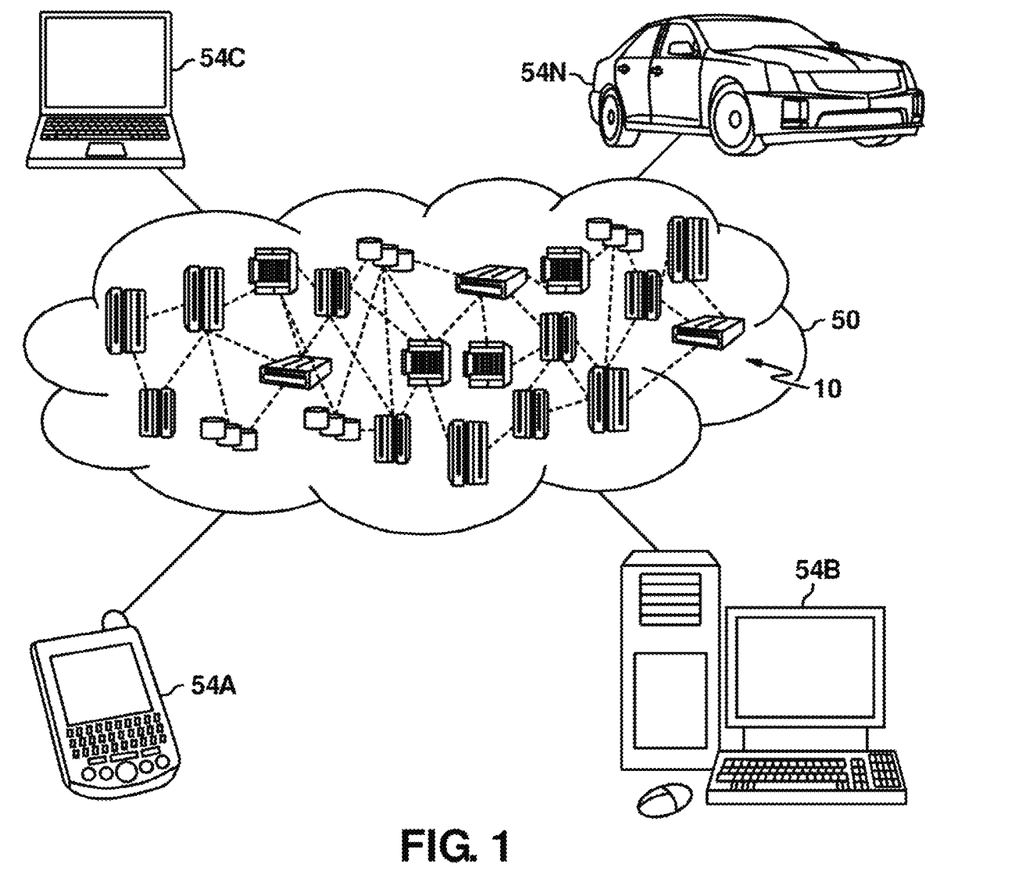
FIG. 1 depicts a cloud computing node according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
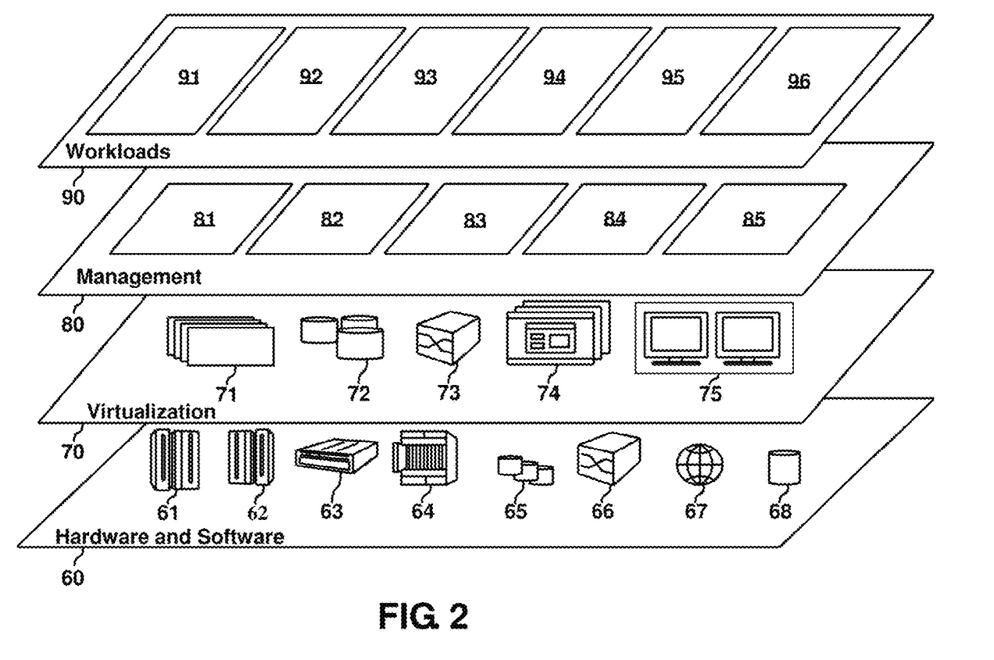
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and event loop optimization 96.

Figure 5:
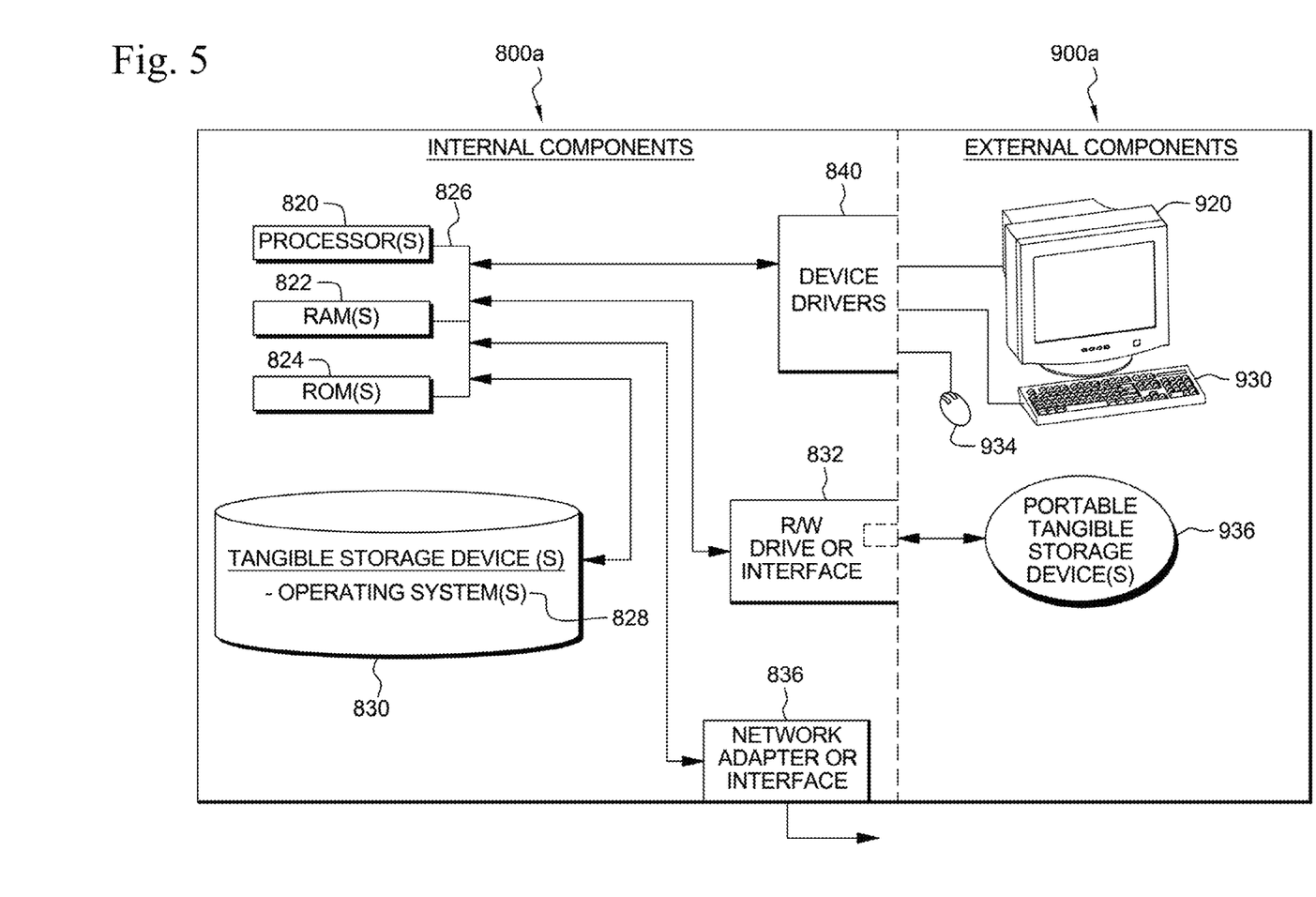
FIG. 5 shows an exemplary diagram of a possible data processing environment in which illustrative embodiments may be implemented.

FIG. 5 illustrates internal and external components of components of the cloud computing environment 50. In FIG. 5, the cloud computing nodes 10, cloud computing devices, and applications of the system can include respective sets of internal components 800a and external components 900a. Each of the sets of internal components 800a includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and tracking program 66 are stored on one or more of the computer-readable tangible storage devices 830 for execution by one or more of the processors 820 via one or more of the RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a also includes a R/W drive or interface 832 to read from and write to one or more portable computer-readable tangible storage devices 936 such as a CD-ROM, DVD, memory stick, magnetic tape, magnetic disk, optical disk or semiconductor storage device.

Each set of internal components 800a also includes a network adapter or interface 836 such as a TCP/IP adapter card. The network may comprise copper wires, optical fibers, wireless transmission, routers, firewalls, switches, gateway computers and/or edge servers.

Each of the sets of external components 900a includes a computer display monitor 920, a keyboard 930, and a computer mouse 934. Each of the sets of internal components 800a also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Figure 3:
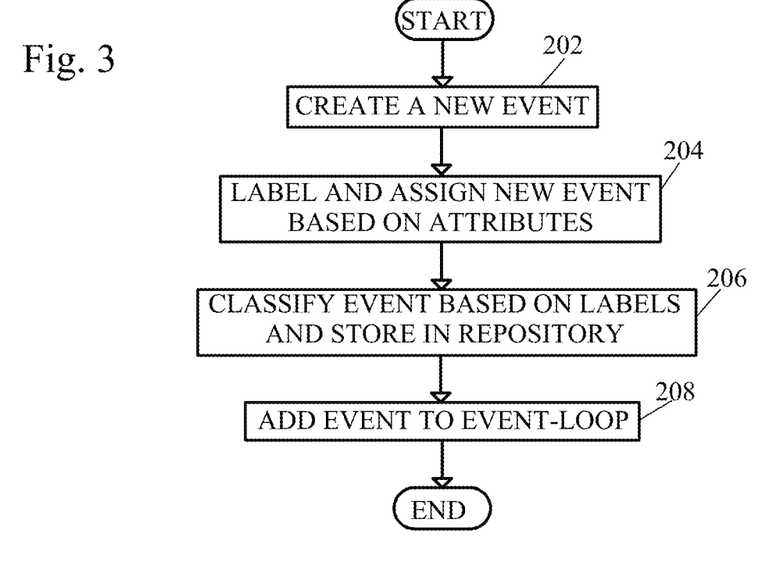
FIG. 3 shows a flow diagram of a method of adding events to an event-loop of an application of a system.

FIG. 3 shows a flow diagram of a method of adding events to an event-loop of an application of a system.

In a first step, an application registers to be informed regarding specific events (step 202), for example by the node 10.

When a new event which is registered to an application is received or created, the new event is labeled by assigning one or more attributes based on characteristics of the event (step 204). The events may be determined by the node or an event-loop which listens for the events. For example, attributes assigned to the new event may be, but are not limited to: incoming, outgoing, network, file, large, small, priority, fast, slow. For example, a request to write data to a socket would be outgoing while requests to read data from a socket would be incoming. Both reading and writing to a socket would be classified as network events. Reads and writes to the local file system would be classified as "file". Requests to read/write a large amount of data (ex>2 k) would be classified as large whereas requests to read/write a small amount of data (ex 100 bytes) would be classified as small.

The attributes associated with the event are classified in different groups and stored in a repository (step 206). Attributes of the new event can be classified into specific groups such as resource usage, client interaction (out to client, in from client) etc. The specific groups may be customized by an administrator or can be predetermined. The groups may be associated with high level objectives on the current workload, such as balance load and/or high throughput. The events are preferably stored in a predefined structure which maintains functions of the events to be invoked when the event is to be executed. For example, the in the case of Node.js, the additional classification information could be stored in the existing structures that contain pointers to the function to be called when an event occurs.

It should be noted that the function of the event to be invoked can be maintained for the event in a repository, such that when the event is ready for execution, additional information can be added to the event being stored.

The event is then added to the event-loop (step 208) and the method ends.

Figure 4:
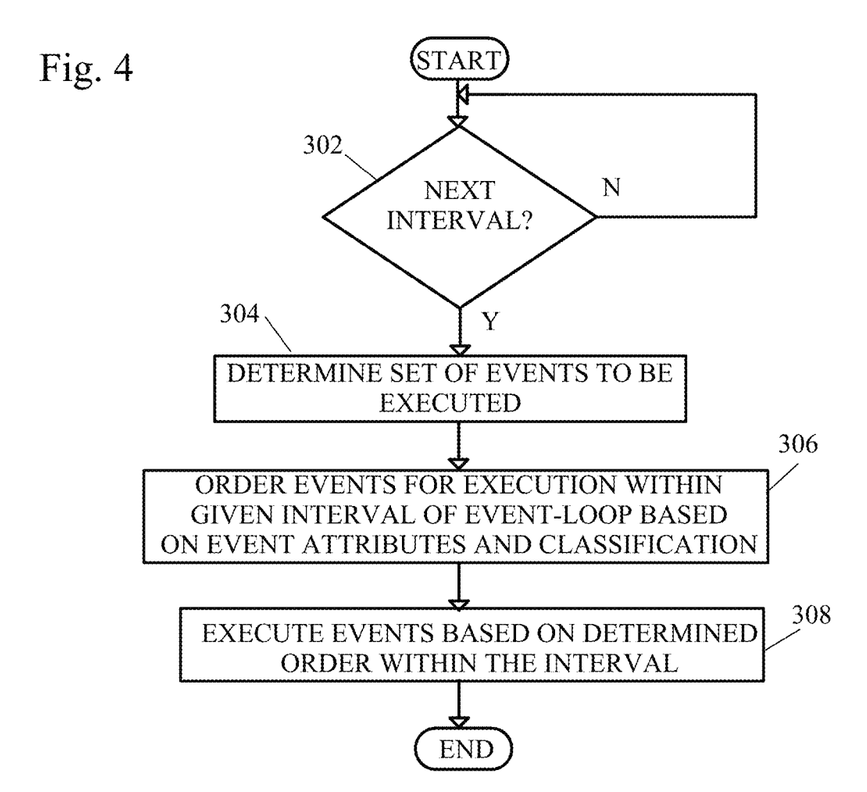
FIG. 4 shows a flow diagram of a method of identifying and reordering events for an event-loop of an application of a system.

FIG. 4 shows a flow diagram of a method of identifying and reordering events for an event-loop of an application of a system.

In a first step, when a next interval is determined (step 302), a set of events to be executed is determined (step 304). The set of events to be executed is determined based on rules for ordering events. The rules may require identifying all of the events for the same resource instance (i.e. file handle) or identifying events associated with a specific attribute, (for example inbound, outbound, or other attributes) to determine ordering of events. It should be noted that an event for execution during an interval may already share an association with a resource.

Once all the events have been identified, the events are ordered for execution within the given interval of the event-loop based on the event attributes and classification of the attributes associated with the events (step 306). The order of the events is based on a sorting of one or more attributes or classifications associated with each of the events when they were created. The sorting and identification of the events may be determined using one or more algorithms. The algorithms can sort or order the events based on different criteria. It should be noted that any information which is captured that can be used to increase the efficiency of the node can be used to order the events. Information can be captured through manual observations, tools and operating system level monitoring tools.

In one embodiment, the events may be sorted to prioritize messages with attributes which indicate visibility to customers, with the events which are most visible to be executed first within the given interval.

In another embodiment, the events may be ordered to ensure that responses to http requests are handled before handling new incoming http requests, ordering the events based on assigned priorities.

In yet another embodiment, the events may be grouped and ordered based on resource usage. For example, alternating the transmission control protocol (TCP) send with the disk write, such that the events are executed as follows: TCP send, disk write, TCP send, disk write, etc, balance load across resources.

In another embodiment, events can be grouped so that events using the same resource instance are either run together or separated apart. For example, multiples of the same operation on a particular file (i.e. multiple reads) could be handled together and therefore be handled more efficiently together. Alternatively it may be more efficient to defer operations on the same file so that there is time in between them.

The events are then executed based on the determined order within the interval by the node (step 308) and the method ends.

If a given interval (step 302) is not set, the method returns to step 302. If a given interval is not set, the next interval may not yet have occurred.

For example, in an http proxy program, which redirects requests and responses between a real server and a client, the server sends 5 KB of data and 50 concurrent clients each issue back-to-back responses. In this example, the responsiveness is measured as the number of completed requests in a unit amount of time.

The events are "data ready to be written" and "data ready to be read". The events were classified as inbound (ready to read) or outbound (ready to write). Reordering of the events was carried out to prioritize the outbound events such that responses are written before new inbound requests are processed.

This example demonstrates that it is feasible to add or use existing information to order events efficiently enough that you can improve the behavior of the runtime. The present example was conducted in an ab—Apache HTTP server benchmarking tool running on Linux x86_64 with 16 GB installed memory, 2.6.32 kernel in Node.js version 0.12.7.

In the event loop management routine, the resultant events list was re-ordered such that all the write events appear first in the list, meaning that the write-ready operations are processed with priority, and without any further delay. By reordering the events such that all write events were first in the list, a 6.02% improvement in responsiveness resulted. Here, the responsiveness was measured as the number of completed requests in unit amount of time. This example demonstrates that it is feasible to add or use existing information in order to order events efficiently enough that you can improve the behavior of runtime.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of software event loop optimization through event ordering within a software event loop of an application, the method comprising the steps of:
    a computer labeling a set of events by assigning one or more attributes to each event of the set of events of an event loop of the application;
    the computer identifying and processing a plurality of events of the set of events for an interval based on at least the attributes of each event of the plurality of events of the event loop of the application;
    the computer ordering the events of the plurality of events within the interval of the event loop of the application based on assigned priorities to the one or more assigned attributes of each event of the plurality of events; and
    the computer executing the plurality of events of the event loop of the application in the order within the interval determined based on the assigned priorities.

2. The method of claim 1, wherein the plurality of events are stored in a predefined structure such that a function of the event is maintained to be invoked when the events are ready for execution.

3. The method of claim 1, further comprising the step of identifying events associated with a same resource of an application within the event loop of the application.

4. The method of claim 1, wherein the plurality of events is further processed based on the classification of the one or more attributes of the plurality of events into groups.

5. The method of claim 1, wherein the assigned priorities of the one or more assigned attributes of the plurality of events are associated with resource usage, such that events are grouped and ordered based on events which use the most resources for execution within the interval.

6. The method of claim 1, wherein the assigned priorities of the plurality of events with externally visible attributes of the runtime of the application to user prioritize events with attributes most visible to the user for execution within the interval of the event loop.

7. The method of claim 1, wherein the event loop is a Node.js event loop.

8. The method of claim 1, wherein the assigned priorities of the plurality of events with attributes which utilize same resource instances are assigned such that events with the same resource instances are executed separately during the interval of the event loop.

9. The method of claim 1, wherein within the assigned priorities priority is assigned to responses to http requests over new, incoming http requests, such that events with the responses to http requests are executed prior to events with new, incoming http requests during the interval of the event loop.

10. A computer program product for software event loop optimization through event ordering within a software event loop of an application of a system comprising a computer comprising at least one processor, one or more memories, one or more computer readable storage media, the computer program product comprising a computer readable storage medium having program instructions embodied therewith, the program instructions executable by the computer to perform a method comprising:
    labeling, by the computer, a set of events by assigning one or more attributes to each event of the set of events of an event loop of the application;
    identifying and processing, by the computer, a plurality of events of the set of events for an interval based on at least the attributes of each event of the plurality of events of the event loop of the application;

ordering, by the computer, the events of the plurality of events within the interval of the event loop of the application based on assigned priorities to the one or more assigned attributes of each event of the plurality of events; and executing, by the computer, the plurality of events of the event loop of the application in the order within the interval determined based on the assigned priorities.

11. The computer program product of claim 10, wherein the plurality of events are stored in a predefined structure such that a function of the event is maintained to be invoked when the events are ready for execution.

12. The computer program product of claim 10, further comprising the program instructions of identifying, by the computer, events associated with a same resource of an application within the event loop of the application.

13. The computer program product of claim 10, wherein the plurality of events is further processed based on the classification of the one or more attributes of the plurality of events into groups.

14. The computer program product of claim 10, wherein the assigned priorities of the one or more assigned attributes of the plurality of events are associated with resource usage, such that events are grouped and ordered based on events which use the most resources for execution within the interval.

15. The computer program product of claim 10, wherein the assigned priorities of the plurality of events with externally visible attributes of the runtime of the application to user prioritize events with attributes most visible to the user for execution within the interval of the event loop.

16. The computer program product of claim 10, wherein the assigned priorities of the plurality of events with attributes which utilize same resource instances are assigned such that events with the same resource instances are executed together during the interval of the event loop.

17. The computer program product of claim 10, wherein the assigned priorities of the one or more assigned attributes of the plurality of events which utilize same resource instances, are executed separately during the interval of the event loop.

18. The computer program product of claim 10, wherein within the assigned priorities priority is assigned to responses to http requests over new, incoming http requests, such that events with the responses to http requests are executed prior to events with new, incoming http requests during the interval of the event loop.

* * * * *